United States Patent
Lee et al.

(10) Patent No.: US 11,456,603 B2
(45) Date of Patent: *Sep. 27, 2022

(54) SAFETY CHARGING SYSTEM FOR ELECTRIC VEHICLE AND SAFETY CHARGING METHOD THEREFOR

(71) Applicants: HYUNDAI MOTOR COMPANY, Seoul (KR); KIA MOTORS CORPORATION, Seoul (KR)

(72) Inventors: Sang Kyu Lee, Yongin-si (KR); Young Chan Byun, Hwaseong-si (KR); Jeong Won Rho, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/036,650

(22) Filed: Sep. 29, 2020

(65) Prior Publication Data
US 2021/0328444 A1    Oct. 21, 2021

(30) Foreign Application Priority Data
Apr. 21, 2020  (KR) .................. 10-2020-0048008

(51) Int. Cl.
*H02J 7/00*    (2006.01)
*H02J 7/16*    (2006.01)
*H02J 7/04*    (2006.01)
*B60L 53/122*  (2019.01)
*B60L 50/61*   (2019.01)

(52) U.S. Cl.
CPC ............ *H02J 7/0032* (2013.01); *B60L 50/61* (2019.02); *B60L 53/122* (2019.02); *H02J 7/04* (2013.01); *B60L 2210/14* (2013.01)

(58) Field of Classification Search
CPC . H02J 7/0032; H02J 7/04; B60L 50/61; B60L 53/122
USPC .................................................. 320/109, 134
See application file for complete search history.

(56) References Cited

U.S. PATENT DOCUMENTS

| | | | | |
|---|---|---|---|---|
| 9,130,489 | B2 * | 9/2015 | Kitano | ...... H02P 6/12 |
| 9,490,741 | B2 * | 11/2016 | Matsui | ...... H01M 10/441 |
| 10,836,267 | B2 * | 11/2020 | Kim | ...... B60L 58/27 |
| 2003/0178955 | A1 * | 9/2003 | Kusase | ...... H02P 6/20 |
| | | | | 318/139 |
| 2008/0309264 | A1 * | 12/2008 | Izumi | ...... B60L 7/16 |
| | | | | 318/376 |
| 2009/0072647 | A1 * | 3/2009 | Hino | ...... B60L 15/007 |
| | | | | 310/156.15 |

(Continued)

FOREIGN PATENT DOCUMENTS

JP       2017-046406 A      3/2017

*Primary Examiner* — Alexis B Pacheco
(74) *Attorney, Agent, or Firm* — Morgan, Lewis & Bockius LLP

(57) ABSTRACT

A safety charging system includes: a motor and an inverter which boost a voltage charged from a high-speed battery charger to a high voltage battery; a current variation amount sensor configured to detect variation amount of a current flowing in a motor coil from the high-speed battery charger; and a controller configured to determine that a rotor of the motor rotates when the variation amount of the current detected in the current variation amount sensor is greater than a reference value and perform control of interrupting a charging process.

5 Claims, 3 Drawing Sheets

(56) References Cited

U.S. PATENT DOCUMENTS

| | | | |
|---|---|---|---|
| 2009/0105042 A1* | 4/2009 | Tanba | B60W 10/02 |
| 2015/0231976 A1* | 8/2015 | Byun | H02H 9/001 |
| | | | 320/109 |
| 2017/0274783 A1* | 9/2017 | Kuribara | B60L 53/20 |
| 2019/0344671 A1* | 11/2019 | Shin | B60L 15/025 |
| 2020/0086849 A1* | 3/2020 | Colavincenzo | B60L 1/02 |
| 2020/0180462 A1* | 6/2020 | Ando | B60L 53/31 |
| 2021/0316630 A1* | 10/2021 | Lee | B60L 50/60 |

* cited by examiner

[FIG. 1] –PRIOR ART–
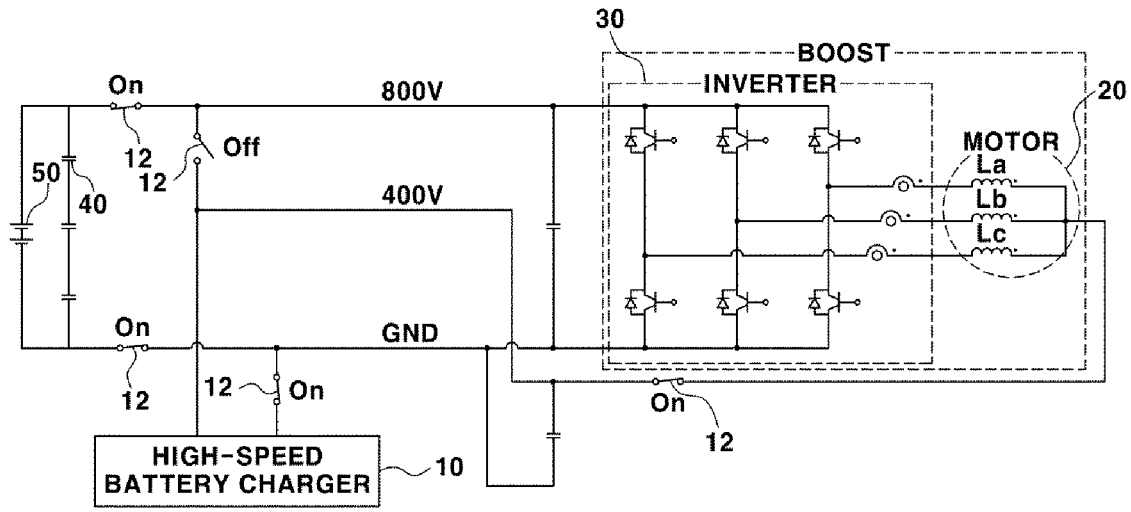
[FIG. 2]
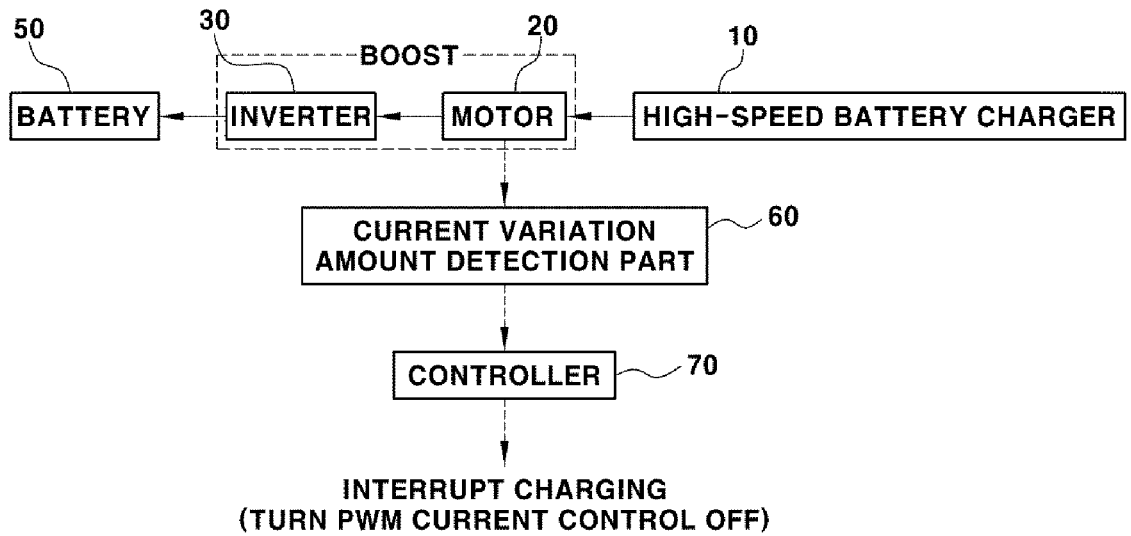

[FIG. 3]
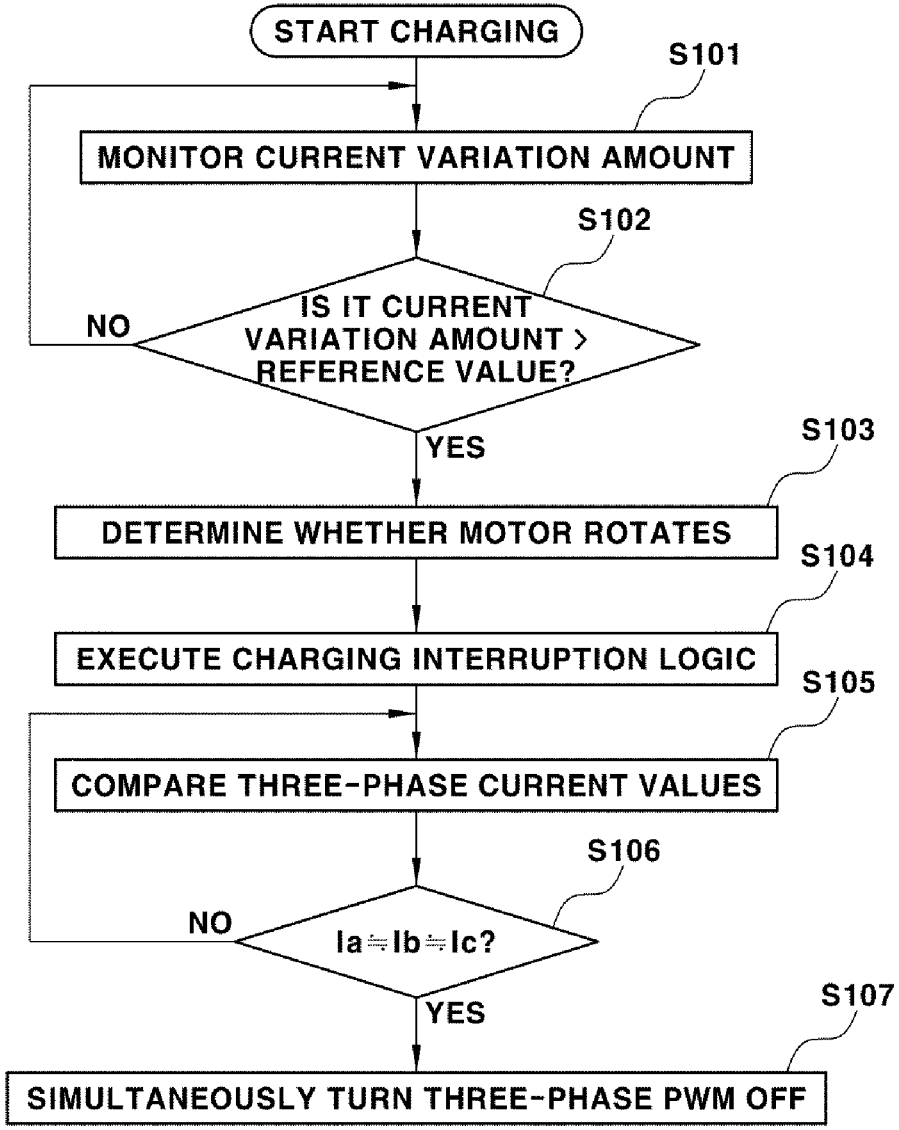

[FIG. 4]
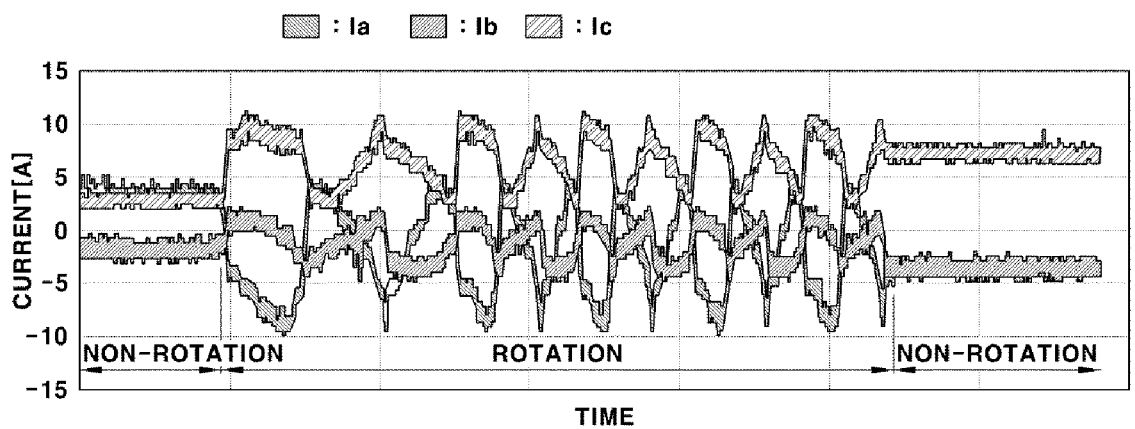

SAFETY CHARGING SYSTEM FOR ELECTRIC VEHICLE AND SAFETY CHARGING METHOD THEREFOR

CROSS-REFERENCE TO RELATED APPLICATION

This application claims the benefit of priority to Korean Patent Application No. 10-2020-0048008 filed on Apr. 21, 2020 in the Korean Intellectual Property Office, the entire contents of which are incorporated herein by reference.

TECHNICAL FIELD

The present disclosure relates to a safety charging system for an electric vehicle and a safety charging method therefor. More particularly, the present disclosure relates to a safety charging system for an electric vehicle and a safety charging method therefor, capable of safely performing a battery charging process, such as boosting of a charging voltage, by operating an inverter and a motor as a booster converter.

BACKGROUND

Generally, hybrid vehicles and electric vehicles, which are kinds of eco-friendly vehicles, include high voltage batteries, driving motors driven by the high voltage batteries as power sources, and inverters for converting alternating current (AC) power into direct current (DC) power when high voltage batteries are charged are discharged.

In particular, the eco-friendly vehicles include charging circuit systems which convert power of external power sources (for example, high-speed battery chargers) into chargeable DC power to generate charging currents for high voltage batteries.

For reference, a system for high-speed charging of the high voltage battery by boosting a charging voltage (for example, boosting from 400 V to 800 V) is referred to as a multi-charging system. Using the multi-charging system, it is possible to charge an 800 V-class high voltage battery of the vehicle at a high speed from a 400 V high-speed battery charger.

FIG. 1 illustrates an example of a charging circuit of a multi-charging system according to a related art. As shown in FIG. 1, when an external high-speed battery charger 10 is connected to a charging circuit of a vehicle in a state in which the vehicle is stopped, relays 12 are turned on and off by a controller to form a high-speed charging path.

Then, a voltage (e.g., 400 V) supplied from the high-speed battery charger 10 is boosted (e.g., 800 V) through a motor 20 and an inverter 30 which serve as a booster converter so that a capacitor 40 and a high voltage battery 50 may be charged at a high speed.

The motor 20 shown in FIG. 1 illustrates an equivalent circuit of a three-phase motor and may be represented by an a-phase inductor La, a b-phase inductor Lb, and a c-phase inductor Lc.

Thus, when a current charged from the high-speed battery charger 10 passes through the motor 20, three-phase currents Ia, Ib, and Ic flow in a motor coil through a pulse width modulation (PWM) control method to generate three-phase forces (torque) moving a rotor. However, the sum of the three-phase forces becomes "zero" so that the rotor of the motor 20 does not move and thus the vehicle remains in a stationary state for safe charging.

However, owing to a design deviation problem of the motor coil and an error or a failure of a current sensor, a current amount of each phase is varied, and when the current amount is varied, the sum of the three-phase forces does not become "zero," and thus the rotor of the motor moves. Consequently, since the rotor of the motor moves, the vehicle moves during charging to threaten safety of a user.

Generally, a rotation of the motor, that is, a movement of the rotor of the motor may be known through a sensing value of a position sensor. However, in a situation in which the position sensor fails, it is not known that the rotor of the motor moves.

Accordingly, there is a need for a method of interrupting charging for safety when whether the motor rotates during charging regardless of the position sensor is determined and then the motor is determined as rotating.

SUMMARY OF THE DISCLOSURE

The present disclosure has been made in an effort to solve the above-described problems associated with prior art.

In one aspect, the present disclosure provides a safety charging system for an electric vehicle and a safety charging method therefor, which are capable of interrupting charging for safety when a movement of a rotor of a motor is detected while an inverter and the motor operate as a booster converter to boost a charging voltage and a battery is charged.

Objectives of the present disclosure are not limited to the above-described objectives, and other objectives of the present disclosure, which are not mentioned, can be understood by the following description and also will be apparently understood through embodiments of the present disclosure. Further, the objectives of the present disclosure can be implemented by means described in the appended claims and a combination thereof.

According to an exemplary embodiment of the present disclosure, a safety charging system for an electric vehicle includes: a motor and an inverter which boost a voltage charged from a high-speed battery charger to a high voltage battery; a current variation amount sensor configured to detect a variation amount of a current flowing in a motor coil from the high-speed battery charger; and a controller configured to determine that a rotor of the motor rotates when the variation amount of the current detected in the current variation amount sensor is greater than a reference value and perform control of interrupting a charging process.

In particular, in order for the control of interrupting the charging process, the controller may be configured to compare three-phase current values Ia, Ib, and Ic flowing in the motor coil and, when differences between the three-phase current values Ia, Ib, and Ic are similar to each other within a reference range, the controller may be configured to simultaneously turn off three-phase current control through a pulse width modulation (PWM) control method.

According to another exemplary embodiment of the present disclosure, a safety charging method for an electric vehicle includes: a charging operation of boosting a voltage supplied from a high-speed battery charger through a motor and an inverter and charging the high voltage battery with the boosted voltage; during the charging operation, detecting, by a current variation amount sensor, a variation amount of a current flowing in a motor coil; comparing, by a controller, a reference value with the variation amount of the current detected in the current variation amount sensor; and as the comparison result, when the variation amount of the current is greater than the reference value, determining, by the controller, a rotor of the motor as rotating and performing control of interrupting the charging operation.

In particular, the control of interrupting the charging operation may include comparing three-phase current values Ia, Ib, and Ic flowing in the motor coil, and when differences between the three-phase current values Ia, Ib, and Ic are similar to each other within a reference range, simultaneously turning control of three-phase currents off through a pulse width modulation (PWM) control method.

When the variation amount of the current is smaller than the reference value, the control method may further include determining, by the controller, the rotor of the motor as not rotating and maintaining the charging operation.

Other aspects and preferred embodiments of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is a diagram illustrating a charging circuit of a multi-charging system according to a related art;

FIG. 2 is a block diagram illustrating a safety charging system for an electric vehicle according to the present disclosure;

FIG. 3 is a flowchart illustrating a safety charging method for an electric vehicle according to the present disclosure; and FIG. 4 is a waveform diagram illustrating an example of detecting a variation amount of a current of a motor during charging.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, exemplary embodiments of the present disclosure will be described in detail with reference to the accompanying drawings.

As described above with reference to FIG. 1, a voltage (e.g., 400 V) supplied from a high-speed battery charger 10, which is an external power source, is boosted (e.g., 800 V) through a motor 20 and an inverter 30 which serve as a booster converter so that a capacitor 40 and a high voltage battery 50 may be charged at a high speed.

Thus, when a current charged from the high-speed battery charger 10 passes through the motor 20, three-phase currents Ia, Ib, and Ic flow in a motor coil by a pulse width modulation (PWM) control method to generate three-phase forces (torque) moving a rotor. However, the sum of the three-phase forces becomes "zero" so that the rotor of the motor 20 does not move and thus the vehicle remains in a stationary state for safe charging.

However, due to a design deviation problem of the motor coil and an error or a failure of a current sensor, a current amount of each phase is varied, and when the current amount is varied, the sum of the three-phase forces does not become "zero," and thus the rotor of the motor moves. Consequently, since the rotor of the motor moves, the vehicle moves during charging to threaten safety of a user.

Accordingly, the present disclosure focuses on that, when the motor and the inverter operate as a booster converter to boost a voltage supplied from the high-speed battery charger, whether the motor rotates is determined, and when a movement of the rotor of the motor is detected, charging may be interrupted for preventing safety accidents.

FIG. 2 is a block diagram illustrating a safety charging system for an electric vehicle according to the present disclosure, and FIG. 3 is a flowchart illustrating a safety charging method for an electric vehicle according to the present disclosure.

As shown in FIG. 2, the safety charging system for an electric vehicle according to the present disclosure includes a high-speed battery charger 10 which is an external power source, a motor 20 and an inverter 30 which serve as a booster converter configured to boost a voltage (e.g., 400 V) supplied from the high-speed battery charger 10 to a voltage (e.g., 800 V), a capacitor 40 and a high voltage battery 50 which are targets to which the boosted voltage is charged, a current variation amount sensor 60 for detecting a variation amount of a current flowing in a motor coil during charging, and a controller 70 for determining whether the motor rotates on the basis of the detected variation amount of the current and performing control of interrupting a charging process.

The current variation amount sensor 60 may include a current sensor which detects the variation amount of the current flowing in the motor coil from the high-speed battery charger 10. The current variation amount sensor 60 may detect a variation amount of an output current flowing between the motor 20 and the inverter 30.

The controller 70 is configured to compare the variation amount of the current detected by the current variation amount sensor 60 with a reference value for determining a rotation of the motor. When the detected variation amount of the current is greater than the reference value, the controller 70 is configured to determine the rotor of the motor as rotating to perform control of interrupting the charging process.

In other words, the controller 70 is configured to compare all variation amounts of three-phase currents flowing in the motor coil, as a variation amount of a mother current detected by the current variation amount sensor 60, with a reference value for determining a rotation of the motor and, when the detected variation amount of the current is greater than the reference value, the controller 70 is configured to determine the rotor of the motor as rotating to perform control of interrupting the charging process.

In particular, in order for the control of interrupting the charging process, the controller 70 is configured to compare three-phase current values Ia, Ib, and Ic flowing in the motor coil and, when the three-phase current values Ia, Ib, and Ic fall within a reference range close to zero and are similar to each other, the controller 70 is configured to simultaneously turn off three-phase current control through a Pulse-Width Modulation (PWM) control method.

Here, the safety charging method of the present disclosure based on the above-described configuration will be described in detail as follows.

First, the motor 20 and the inverter 30 which serve as a booster converter, boost the voltage (e.g., 400 V) supplied from the high-speed battery charger 10, which is an external power source, to a voltage (e.g., 800 V), and the capacitor 40 and the high voltage battery 50 are charged at a high speed.

During the above charging process, the current variation amount sensor 60 monitors and detects a variation amount of a current flowing in the motor coil (S101).

Subsequently, the controller 70 compares a reference value with the variation amount of the current detected in the current variation amount detection part 60 (S102).

That is, the controller 70 compares a reference value for determining a rotation of the motor with all variation amounts of three-phase currents flowing in the motor coil, which is a variation amount of the current detected by the current variation amount sensor 60.

In this case, during the charging process, a value of a current applied to the motor, that is, a coil of a three-phase motor is constant. However, when the rotor of the motor rotates, an inductance value of the motor coil is varied due to a magnetic flux of a permanent magnet of the rotor, and the value of the current flowing in the motor coil is also varied over time.

Thus, during the charging process, when the value of the current applied to the motor, that is, the coil of the three-phase motor is constant, it may be determined as a non-rotation state in which the rotor of the motor does not rotate, whereas, when the variation amount of the current which flows in the motor coil and is varied over time is greater than the reference value, it may be determined that the rotor of the motor rotates.

Therefore, as the comparison result in S102, when the variation amount of the current is greater than the reference value, the controller 70 determines the rotor of the motor as rotating (S103), and, in order to prevent a movement of the vehicle due to the rotation of the motor, control of interrupting the charging process is performed (S104).

Thus, when the motor is determined as rotating, the controller 70 may interrupt the charging process to prevent a safety accident due to the movement of the vehicle during charging.

In this case, the charging interruption control by the controller 70 may be achieved by interrupting control of three-phase currents flowing in the motor coil through the PWM control method.

However, when the control of the three-phase currents is interrupted and thus there is a large difference in value of three-phase currents, and when the control of the three-phase currents is turned off in a random order, an additional rotation of the motor may occur.

Therefore, the control of interrupting the charging process includes comparing the three-phase current values Ia, Ib, and Ic flowing in the motor coil (S105), determining whether the three-phase current values Ia, Ib, and Ic fall within a reference range close to zero and are similar to each other (S106). When differences between the three-phase current values Ia, Ib, and Ic are similar to each other within the reference range close to zero, simultaneously turning off three-phase current control through the PWM control method (S107).

As described above, when the differences between the three-phase current values Ia, Ib, and Ic flowing in the motor coil are similar to each other within the reference range close to zero, the three-phase current control is simultaneously turned off through the PWM control method so that occurrence of the additional rotation of the motor may be prevented.

As the comparison result in S102, when the variation amount of the current is smaller than the reference value, the controller 70 determines the rotor of the motor as a non-rotation state in which the rotor of the motor does not rotate to maintain the charging process.

As described above, in the electric vehicle in which the motor and the inverter operate as a booster converter to boost a charging voltage and a battery is charged, the variation amount of the current of the motor coil is monitored to detect whether the motor rotates, and, when the motor is determined as rotating, the charging is interrupted so that it is possible to prevent a safety accident due to a movement of the vehicle during charging.

The present disclosure provides the following effects through the above-described problem solving means.

In accordance with the present disclosure, in an electric vehicle in which a motor and an inverter operate as a booster converter to boost a charging voltage and a battery is charged, a variation amount of a current of the motor coil is monitored to detect whether the motor rotates, and when the motor is determined as rotating, charging is interrupted so that it is possible to prevent a safety accident due to a movement of a vehicle during charging.

Although the embodiments of the present disclosure have been described in detail, the scope of the prevent disclosure is not limited to these embodiments, and various modifications and improvements devised by those skilled in the art using the fundamental concept of the present disclosure, which is defined by the appended claims, further fall within the scope of the present disclosure.

What is claimed is:

1. A safety charging system for an electric vehicle, comprising:
   a motor and an inverter, which boost a voltage charged from a high-speed battery charger to a high voltage battery;
   a current variation amount sensor configured to detect a variation amount of a current flowing in a motor coil from the high-speed battery charger; and
   a controller configured to:
   determine that a rotor of the motor rotates when the variation amount of the current detected in the current variation amount sensor is greater than a reference value, and
   perform control of interrupting a charging process.

2. The safety charging system of claim 1, wherein the controller is configured to compare three-phase current values flowing in the motor coil, and
   wherein, when differences between the three-phase current values are within a reference range, the controller is configured to turn off three-phase current control through a pulse width modulation (PWM) control method.

3. A safety charging method for an electric vehicle, comprising:

boosting a voltage supplied from a high-speed battery charger through a motor and an inverter and charging the high voltage battery with the boosted voltage, wherein the boosting includes detecting, by a current variation amount sensor, a variation amount of a current flowing in a motor coil;

comparing, by a controller, a reference value with the variation amount of the current; and upon determining that the variation amount of the current is greater than the reference value, determining, by the controller, a rotor of the motor as rotating and performing control of interrupting the charging operation.

4. The safety charging method of claim 3, wherein the performing control of interrupting the charging operation includes:

comparing three-phase current values flowing in the motor coil; and upon determining that differences between the three-phase current values are within a reference range, turning off three-phase current control through a pulse width modulation (PWM) control method.

5. The safety charging method of claim 3, further comprising that, upon determining that the variation amount of the current is smaller than the reference value, determining, by the controller, the rotor of the motor as not rotating and maintaining the boosting a voltage supplied from a high-speed battery charger.

* * * * *